US006990106B2

(12) United States Patent
Bhatia

(10) Patent No.: US 6,990,106 B2
(45) Date of Patent: Jan. 24, 2006

(54) CLASSIFICATION AND TAGGING RULES FOR SWITCHING NODES

(75) Inventor: Jagjeet Bhatia, Calabasas, CA (US)

(73) Assignee: Alcatel, Paris (FR)

( * ) Notice: Subject to any disclaimer, the term of this patent is extended or adjusted under 35 U.S.C. 154(b) by 776 days.

(21) Appl. No.: 09/812,146

(22) Filed: Mar. 19, 2001

(65) Prior Publication Data

US 2002/0131411 A1 Sep. 19, 2002

(51) Int. Cl.
*H04L 12/28* (2006.01)

(52) U.S. Cl. .................................. 370/395.53; 370/392

(58) Field of Classification Search ................ 370/389, 370/412, 428, 395.53, 390, 392, 396, 399, 370/400, 401, 402, 422, 216, 222, 255, 254, 370/238, 351, 391, 395.31; 709/218, 223, 709/238, 240

See application file for complete search history.

(56) References Cited

U.S. PATENT DOCUMENTS

| | | | | |
|---|---|---|---|---|
| 6,128,666 | A * | 10/2000 | Muller et al. | 709/238 |
| 6,181,699 | B1 * | 1/2001 | Crinion et al. | 370/392 |
| 6,188,694 | B1 * | 2/2001 | Fine et al. | 370/402 |
| 6,249,521 | B1 * | 6/2001 | Kerstein | 370/389 |
| 6,445,709 | B1 * | 9/2002 | Chiang | 370/399 |
| 6,515,993 | B1 * | 2/2003 | Williams et al. | 370/395.53 |
| 6,570,875 | B1 * | 5/2003 | Hegde | 370/389 |
| 6,590,861 | B1 * | 7/2003 | Vepa et al. | 370/216 |
| 6,639,901 | B1 * | 10/2003 | Katzri et al. | 370/255 |
| 6,658,012 | B1 * | 12/2003 | Baucom et al. | 370/401 |
| 6,680,945 | B1 * | 1/2004 | Merchant et al. | 370/395.53 |
| 2001/0005369 | A1 * | 6/2001 | Kloth | 370/392 |
| 2002/0091795 | A1 * | 7/2002 | Yip | 709/218 |

OTHER PUBLICATIONS

Internet Papers: "Supplemental to EIII Std 802. 1Q Virtual Bridged Local Area Networks, VLAN Classification by Protocol and Port"; IEEE Draft P802. 1v/D3; LAN MAN Standards Committee of the IEEE Computer Society; May 4, 2000; 85 pp.

Internet papers: *IEEE Standard for Local and Metropolitan Area Networks: Virtual Bridge Local Area Networks*; IEEE Standard 802.1Q; The Institute of Electrical and Electronics Engineers, Inc.: New York, New York; 1998; 211 pp.

* cited by examiner

*Primary Examiner*—Phirin Sam
(74) *Attorney, Agent, or Firm*—Craig A. Hoersten; V. Lawrence Sewell

(57) ABSTRACT

A VLAN classification and tagging system for a switching node. During VLAN classification, an inbound packet is assigned to a VLAN in accordance with a classification mode selectable from a PASS, FORCE, and PROTOCOL modes. In PASS mode, the packet is assigned to a VLAN associated with a VLAN ID from the packet. In FORCE mode, the packet is assigned to a VLAN associated with an ingress port. In PROTOCOL mode, the packet is assigned to a VLAN associated with a protocol type of the packet. During VLAN tagging, a VLAN identifier in an outbound packet is modified or not in accordance with a tagging mode selectable from a PASS, FORCE, and REMOVE modes. In PASS mode, the VLAN ID in the packet is retained as received. In FORCE mode, the VLAN ID in the packet is replaced with a VLAN ID to which the packet was classified at inbound. In REMOVE mode, the VLAN ID from the packet is removed without substitution.

11 Claims, 4 Drawing Sheets

CLASSIFICATION AND TAGGING RULES FOR SWITCHING NODES

FIELD OF THE INVENTION

This invention relates generally to virtual local area networks (VLANs), and more particularly to VLAN classification and tagging rules for switching nodes.

BACKGROUND OF THE INVENTION

Recent vintage switching nodes that perform Layer 2 forwarding, such as bridging, classify data packets (also referred to as frames) into VLANs in order to differentiate service. Two standards have emerged for defining VLAN classification protocols, namely IEEE Standard 802.1Q entitled "IEEE Standard for Local and Metropolitan Area Networks: Virtual Bridge Local Area Networks," 1998, and IEEE Draft Standard 802.1V entitled "Draft Standard for Supplement to IEEE 802.1Q: IEEE Standard for Local and Metropolitan Area Networks: Virtual Bridge Local Area Networks," 2000, the contents of which are hereby incorporated by reference. Standard 802.1Q provides two basic VLAN classification rules: (1) if an inbound packet contains a tag header having a valid VLAN ID, assign the packet to a VLAN associated with the VLAN ID; and (2) if an inbound packet does not contain a tag header having a valid VLAN ID, assign the packet to a VLAN associated with the ingress port.

Standard 802.1V adopts rule (1) and modifies rule (2) as follows: if an inbound packet does not contain a tag header having a valid VLAN ID, assign the packet to a VLAN associated with the protocol type of the inbound packet from within a protocol VLAN set associated with the ingress port.

Standards 802.1Q and 802.1V also provide VLAN tagging rules for adding a tag header including an assigned VLAN ID to a packet prior to transmitting the packet on an egress port.

The provision in Standards 802.1Q and 802.1V (hereinafter referred as "Standards") of VLAN classification rules for inbound packets that do not contain a tag header having a valid VLAN ID recognizes the possible construction of hybrid networks in which a combination of Standards-observant and Standards-unobservant switching nodes coexist. Yet there is no indication of what rules a Standards-unobservant switching node in such a hybrid network must follow in VLAN-classifying an inbound packet. For instance, it is not clear whether a Standards-unobservant switching node, such as an ingress port, should assign an inbound packet containing a tag header having a valid VLAN ID, to a VLAN associated with the VLAN ID in the packet, a VLAN associated with the ingress port, or a VLAN associated with a protocol type of the packet. It is also not clear how a Standards-unobservant switching node should VLAN-classify an inbound packet that does not contain a tag header having a valid VLAN ID.

Moreover, the Standards do not contemplate the possible construction of hybrid switching nodes including a combination of Standards-observant and Standards-unobservant ports. Additional VLAN classification questions arise in such cases. For instance, it is not clear to what extent, if any, a Standards-unobservant egress port should respect a VLAN classification decision made at an ingress port for purposes of tagging an outbound packet.

Furthermore, it is not clear how future updates and modifications to the Standards are to be handled by the switching nodes.

There is therefore a need for a VLAN classification and tagging system for a switching node that allows a degree of flexibility in defining VLAN classification and tagging rules.

SUMMARY OF THE INVENTION

According to one embodiment, the present invention provides a VLAN classification system for a switching node characterized in that an inbound packet having a VLAN identifier is assigned to a VLAN in accordance with a classification mode selectable from ones of classification modes. According to one embodiment, the ones of classification modes include a PASS, FORCE, and/or PROTOCOL mode. In a PASS mode, the inbound packet is assigned to a VLAN associated with the VLAN ID from the packet. In a FORCE mode, the inbound packet is assigned to a VLAN associated with an ingress port. In a PROTOCOL mode, the inbound packet is assigned to a VLAN associated with a protocol type of the packet.

According to another embodiment, the present invention provides a VLAN tagging system for a switching node characterized in that a VLAN ID in an outbound packet is modified or not in accordance with a tagging mode selectable from ones of tagging modes. According to one embodiment, the ones of tagging modes include a PASS, FORCE, and/or REMOVE mode. In PASS mode, the VLAN ID in the outbound packet is retained as received. In FORCE mode, the VLAN ID in the outbound packet is replaced with a VLAN ID to which the packet is classified at inbound. In REMOVE mode, the VLAN ID from the outbound packet is removed without substitution.

According to a further embodiment of the invention, a switching node has a plurality of ports interconnected across a switching link. A first one of the ports has a first VLAN classification mode operative thereon, and a second one of the ports has a second VLAN classification mode operative thereon, where the first and second VLAN classification modes are different.

According to an additional embodiment of the invention, a switching node has a plurality of ports interconnected across a switching link. A first one of the ports has a first VLAN tagging mode operative thereon, and a second one of the ports has a second VLAN tagging mode operative thereon, where the first and second VLAN tagging modes are different.

DESCRIPTION OF THE DRAWINGS

These and other features, aspects and advantages of the present invention will be more fully understood when considered with respect to the following detailed description, appended claims, and accompanying drawings where:

DESCRIPTION OF THE INVENTION

Figure 1:
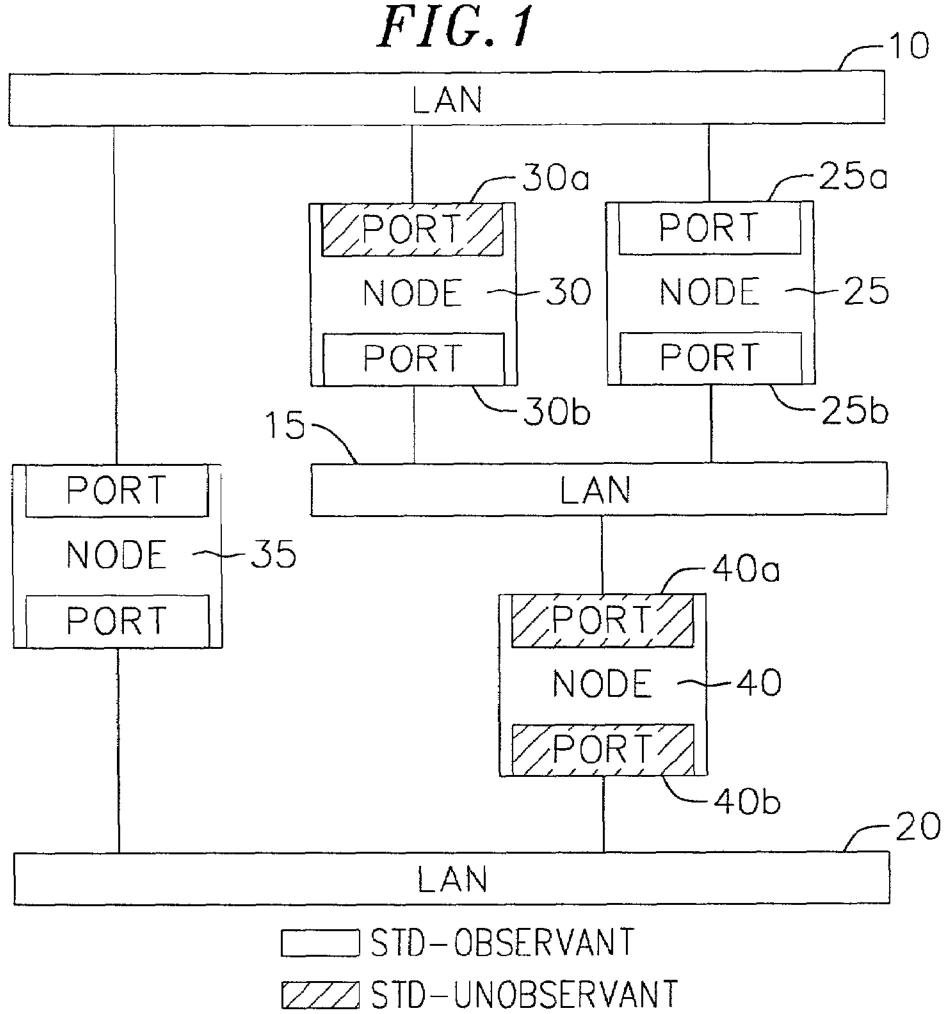
FIG. 1 is a schematic block diagram of a data communication network including local area network (LAN) communication media interconnected by switching nodes according to one embodiment of the invention.

FIG. 1 is a schematic block diagram of a data communication network including local area network (LAN) communication media 10, 15, 20 interconnected by switching nodes 25, 30, 35, 40. Switching nodes 25, 30, 35, 40 are preferably gateway devices such as, for example, switches, routers, and the like. In the illustrated example, switching node 25 is a Standard-observant node preferably following a VLAN classification and tagging protocol, such as, for example, Standard 802.1Q or Standard 802.1V. Switching node 25 includes switching interfaces preferably taking the form of data communication ports 25*a*, 25*b* for forwarding packets to and from LANs 10 and 15 in accordance with one or more operative communication protocols known in the art, such as, for example, media access control (MAC) bridging and internet protocol (IP) routing. Ports 25*a* and 25*b* are Standard-observant ports preferably adhering to a VLAN classification/tagging protocol for classifying/tagging inbound/outbound packets.

Switching node 30 is a hybrid node including switching interfaces preferably taking the form of data communication ports 30*a*, 30*b* for forwarding packets to and from LANs 10 and 15 in accordance with a communication protocol known in the art. Port 30*a* is a Standards-unobservant port that preferably does not follow any VLAN classification and tagging protocol for VLAN classification and tagging of packets. Port 30*b*, however, is a Standard-observant port that follows a VLAN classification and tagging protocol, such as, for example, Standard 802.1Q or Standard 802.1V.

Switching node 40 is a Standards-unobservant node including switching interfaces preferably taking the form of data communication ports 40*a*, 40*b* for forwarding packets to and from LANs 15 and 20 in accordance with a communication protocol known in the art. Neither port 40*a* nor 40*b* adhere to a VLAN classification and tagging protocol for VLAN classifying and tagging of packets.

Although switching nodes 25, 30, 35, 40 are each shown to include only two ports, it should be appreciated that the nodes operating in accordance with the present invention may include one or more ports acting as ingress and/or egress ports. It should also be appreciated that the illustrated data communication network may include any number of Standard-observant, Standards-unobservant, and hybrid switching, nodes and/or ports interconnected in any manner to the LANs 10, 15, 20.

According to one embodiment of the invention, a Standards-unobservant ingress port such as, for example, port 30*a*, 40*a*, or 40*b* receives inbound packets from external sources, such as, for example, LANs 10, 15, or 20, and forwards the packets internally to another port. The inbound packets preferably contain VLAN tag headers including VLAN identifiers (IDs) as set forth in the Standards.

Upon receipt of an inbound packet having a VLAN ID, the ingress port preferably classifies the packet to a VLAN in accordance with a VLAN classification mode configured on the port. The classification mode is selected from a plurality of classification modes preferably including a PASS mode, FORCE mode, and PROTOCOL mode. If the ingress port is set on a PASS mode, the inbound packet is preferably assigned to a VLAN associated with the VLAN ID indicated in the VLAN tag header of the packet. If the ingress port is set on a FORCE mode, the inbound packet is preferably assigned to a VLAN associated with the ingress port. If the ingress port is set on a PROTOCOL mode, the inbound packet is preferably assigned to a VLAN in accordance with a protocol type of the inbound packet.

According to another embodiment of the invention, a Standards-unobservant egress port, such as, for example, port 30*a*, 40*a*, or 40*b* receives an outbound packet internally from another port and transmits the packet to an external entity, such as, for example, LANs 10, 15, or 20. The outbound packets preferably contain VLAN tag headers including VLAN IDs as set forth in the Standards.

Upon receipt of an outbound packet having a VLAN ID, the egress port retains, replaces, or removes the VLAN ID based on a tagging mode set for the egress port. The tagging mode is selected from a plurality of tagging modes preferably including a PASS mode, FORCE mode, and REMOVE mode. If the egress port is set on a PASS mode, the VLAN ID in the outbound packet is preferably retained. If the egress port is set on a FORCE mode, the VLAN ID is preferably replaced with a VLAN ID selected during ingress classification. If the egress port is set on a REMOVE mode, the VLAN ID is preferably removed and not replaced. The tagging mode set for the egress port may be the same or different than the classification mode set for the ingress port. Furthermore, two ingress/egress ports on the same switching node may have the same or different classification/tagging modes.

Figure 2:
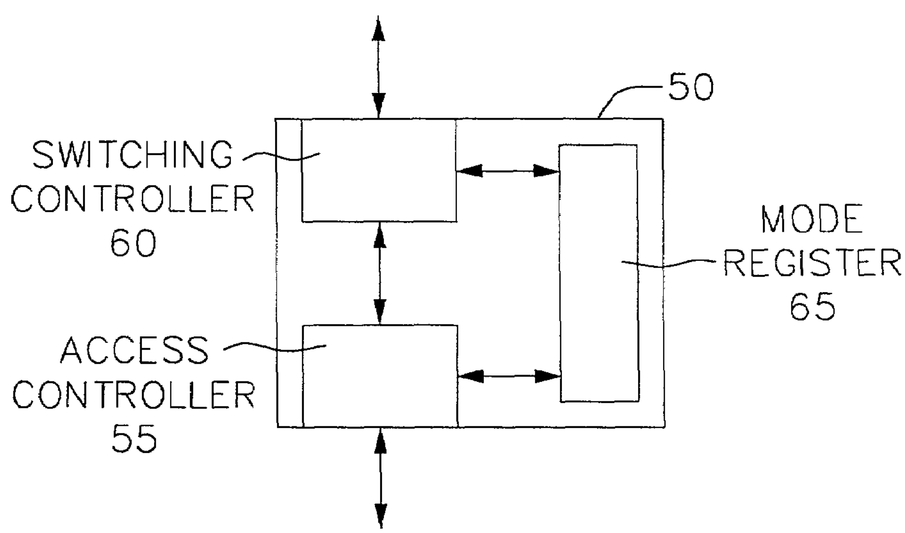
FIG. 2 is a schematic block diagram of a Standards-unobservant port according to one embodiment of the present invention.

FIG. 2 is a schematic block diagram of a Standards-unobservant port 50 according to one embodiment of the present invention. The Standards-unobservant port 50 may be similar, for example, to the Standards-unobservant ports 30*a*, 40*a*, or 40*b* of FIG. 1.

The Standards-unobservant port 50 includes an access controller 55 coupled between LANs and a switching controller 60. The switching controller in turn is coupled to a mode register 65 storing the VLAN classification and/or tagging mode set for the port.

The access controller 55, which may, for example, include a media access controller (MAC), preferably receives inbound packets off LANs and performs physical and MAC layer operations on the inbound packets. If the port is operating on a PASS mode, the operation may include determining if the VLAN ID indicated in the VLAN tag header of the packet is valid. If the VLAN ID is valid, the packet is transmitted to the switching controller 60. Otherwise the packet is preferably dropped.

If the port is operating on a PROTOCOL mode, the access controller 55 determines the protocol type of the inbound packet and further determines if the protocol is supported by the port. If the protocol is supported, the packet is transmitted to the switching controller 60. If the protocol is not supported, the packet is assigned to a default protocol group and then transmitted to the switching controller 60.

The access controller 55 preferably also receives outbound packets from the switching controller 60 and transmits the packets on LANs. The access controller 55 may also perform physical and MAC layer operations on the outbound packets prior to transmitting them on the LANs.

The switching controller 60 preferably is programmable for handling packets having wide variety of communications protocols. The switching controller 60 preferably receives inbound packets, classifies the packets, and transmits the packets on a switching backplane. In classifying the packets, the switching controller determines the VLAN classification mode to which the port is set by querying the mode register 65. The packet is classified to a particular VLAN based on the set classification mode.

The switching controller 60 preferably also receives outbound packets from other switching controllers via the switching backplane, tags the packets with the appropriate VLAN ID, and transmits them to the access controller 55 for forwarding on LANs. In tagging the packets, the switching controller determines the VLAN tagging mode to which the port is set by examining the mode register 65, and retains, replaces, or removes the VLAN ID associated with the packet based on the set tagging mode.

The mode register 65 is preferably programmable with a VLAN classification and/or tagging mode selected for the port. Preferably, default classification and tagging modes are assigned to the port during configuration of the port. Thereafter, an administrator may change the modes, preferably based on CLI (Command Line Interface) commands. In this regard, the user may select a desired classification mode from available modes preferably including PASS, FORCE, and PROTOCOL modes. The user may also select a desired tagging mode from available modes preferably including PASS, FORCE, and REMOVE modes. Although the illustrated embodiment includes only one mode register, two separate registers may be maintained for separately storing the classification and tagging modes. The classification and tagging modes may be the same or different from one another. Furthermore, different classification/tagging modes may be operative on two or more ingress/egress ports of the node.

Figure 3:
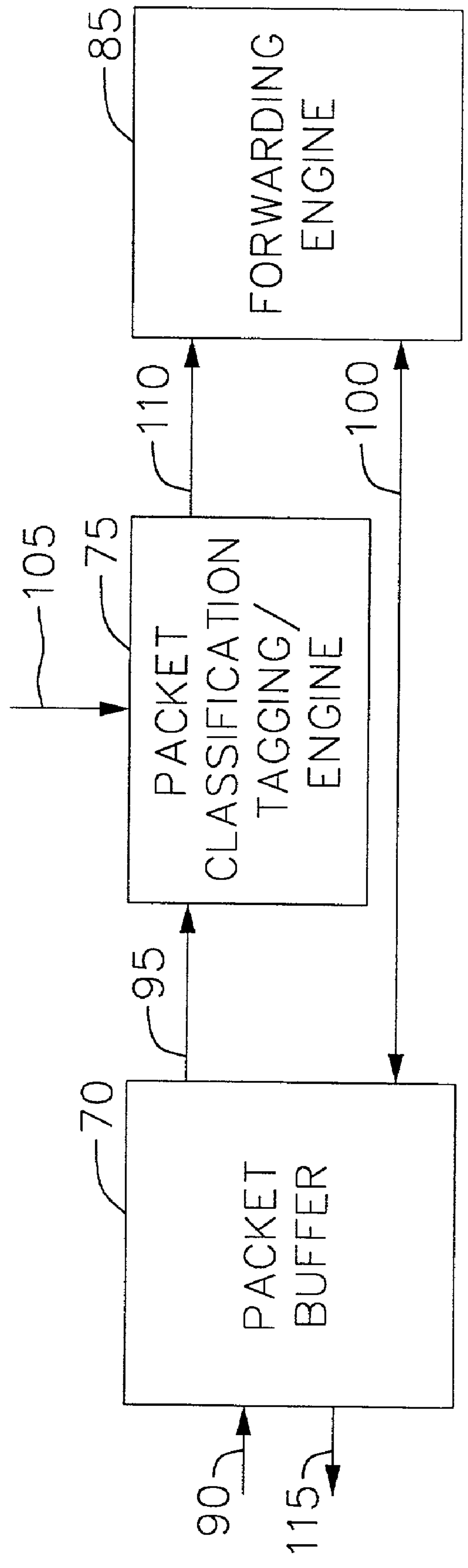
FIG. 3 is a more detailed schematic block diagram of a switching controller in the Standards-unobservant port of FIG. 2 according to one embodiment of the invention.

FIG. 3 is a more detailed schematic block diagram of the switching controller 60 of FIG. 2 according to one embodiment of the invention. The switching controller 60 may also be referred to as a packet processor, network processor, communications processor, or as another designation commonly used by those skilled in the art.

The switching controller 60 includes a packet buffer 70, packet classification/tagging engine 75, and forwarding engine 85. The classification/tagging and forwarding engines 75, 85 are preferably hardware modules programmed by software. Alternatively, the system may be may be accomplished in combination of firmware (such as, for example, application specific integrated circuits or other customized circuits), and/or software, or by any method known in the art.

Switching controllers in other embodiments may include more or less components. For example, a switching controller in another embodiment may include a pattern match module for comparing packet portions against a predetermined pattern to look for a match. The switching controller in yet another embodiment may include an edit module for editing inbound packets to generate outbound packets. The switching controller in a further embodiment may include a filtering database storing information for filtering data packets.

The switching controller 60 preferably receives inbound packets 90. The packets may include, but are not limited to, Ethernet frames, ATM cells, TCP/IP and/or UDP/IP packets, and may also include other Layer 2 (Data Link/MAC Layer), Layer 3 (Network Layer) or Layer 4 (Transport Layer) data units. For example, the packet buffer 70 may receive inbound packets from one or more Media Access Control (MAC) Layer interfaces over the Ethernet.

The received packets preferably are stored in the packet buffer 70. The packet buffer 70 may include a packet FIFO for receiving and temporarily storing the packets. The packet buffer 70 preferably provides the stored packets or portions thereof to the packet classification/tagging engine 75 and forwarding engine 85 for processing.

The packet buffer 70 may also include an edit module for editing the packets prior to forwarding them out of the switching controller as outbound packets 115. The edit module may include an edit program construction engine for creating edit programs real-time and/or an edit engine for modifying the packets. The outbound packets 115 may be transmitted over a switching fabric interface to communication networks, such as, for example, the Ethernet.

The packet buffer 70 may also include either or both a header data extractor and a header data cache. The header data extractor preferably is used to extract one or more fields from the packets, and to store the extracted fields in the header data cache as extracted header data. The extracted header data may include, but are not limited to, some or all of the VLAN tag header. In an Ethernet system, for example, the header data cache may also store first N bytes of each frame.

The extracted header data preferably is provided in an output signal 95 to the packet classification/tagging engine 75 for processing. The forwarding engine may also request and receive the extracted header data over an interface 100. The extracted header data preferably includes a VLAN ID and optionally, a Layer 3 protocol type associated with an inbound packet. Other data may include, but are not limited to, Layer 2 MAC addresses, Layer 2 encapsulation type, Layer 3 addresses, ToS (type of service) values, and/or Layer 4 port numbers. In other embodiments, the output signal 95 may include the whole inbound packet, instead of or in addition to the extracted header data. In still other embodiments, the packet classification/tagging engine 75 may be used to edit the extracted header data to be placed in a format suitable for use by the forwarding engine 85, and/or to load data into the header data cache.

The packet classification/tagging engine 75 preferably includes logic to VLAN classify an inbound packet having a VLAN ID to a VLAN in accordance with a classification mode set in the mode register 65. The packet classification/tagging engine 75 queries and receives the classification mode from the mode register 65 via interface 105. Based on the set mode, the classification/tagging engine 75 classifies the packet to a VLAN and transmits the classification information to the forwarding engine 85 over interface 110. The packet classification/tagging engine 75 preferably also includes logic to VLAN tag an outbound packet having a VLAN ID to a VLAN in accordance with a tagging mode set in the mode register 65. The packet tagging engine 75 queries and receives the tagging mode from the mode register 65 via interface 105. Based on the set mode, the classification/tagging engine 75 retains, removes, or replaces the original VLAN ID contained in the packet. The tagging information is transmitted to the forwarding engine 85 over interface 110.

The forwarding engine 85 preferably filters packets based on filtering information stored in a filtering database, assigns the packets to queues based on priority information, and selects queued packets for transmission. The packets may be filtered based on Layer 2 addresses, VLAN IDs, and the like.

Figure 4:
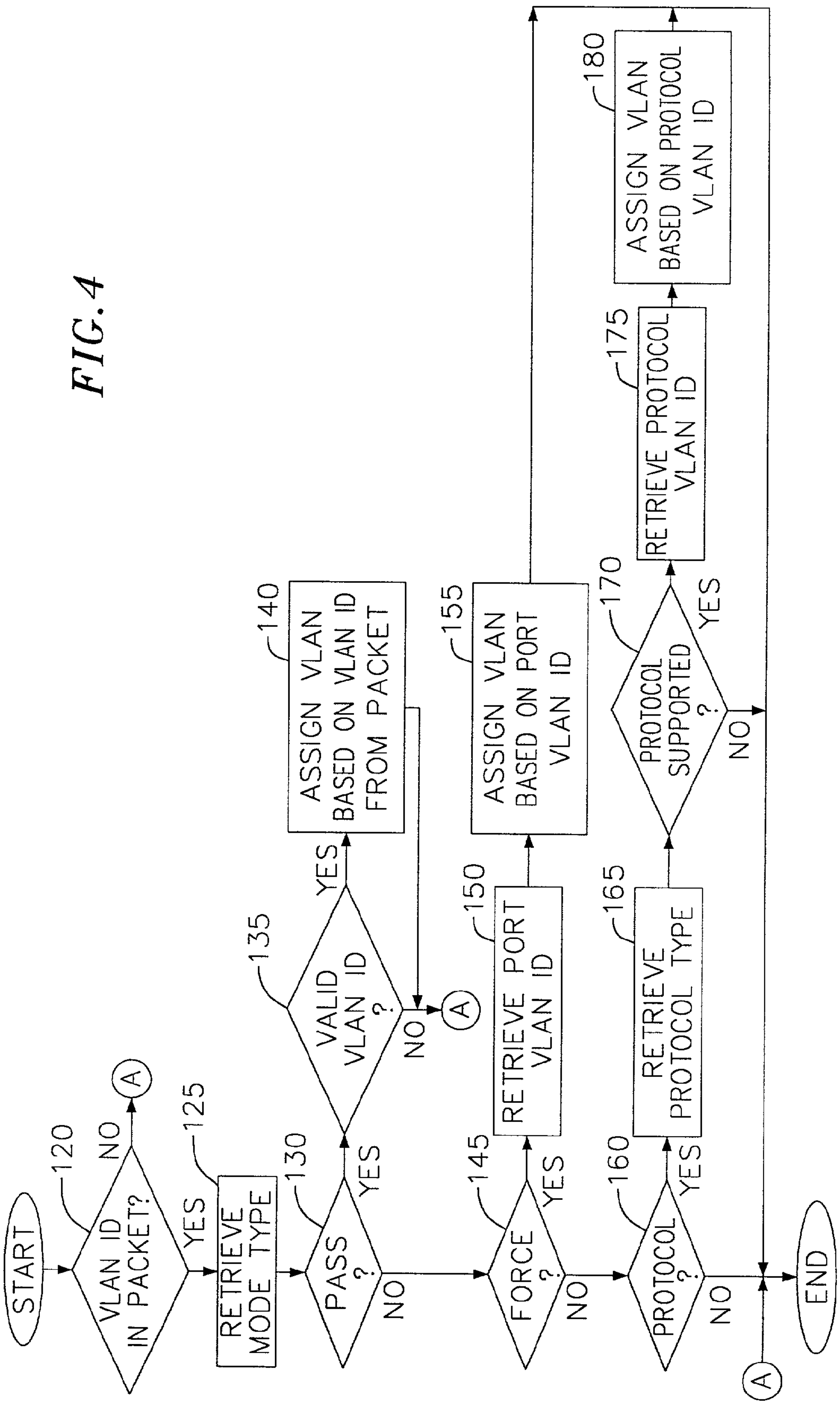
FIG. 4 is a process flow diagram for VLAN classifying a packet according to one embodiment of the invention.

FIG. 4 is a process flow diagram for VLAN classifying a packet according to one embodiment of the invention. The process starts, and in step 120, the access controller 55 determines whether a received inbound packet includes a VLAN tag header including a VLAN ID. In step 125, the access controller 55 retrieves the classification mode type from the mode register 65. In step 130, the access controller 55 determines if a PASS mode was retrieved. If the answer is YES, the access controller 55 determines if the VLAN ID is valid. For instance, this may be accomplished by attempting to match the received VLAN ID with a list of valid VLAN IDs configured on the port. If the VLAN ID is valid, the packet is transmitted to the switching controller 60 which, in step 140, classifies the packet to a VLAN associated with the VLAN ID from the packet.

In step 145, the access controller 55 determines if a FORCE mode was retrieved. If the answer is YES, the packet is transmitted to the switching controller 60 which, in step 150, retrieves a VLAN ID associated with the port. In step 155, the switching controller 155 classifies the packet to a VLAN associated with the VLAN ID associated with the port.

In step 160, the access controller 55 determines if a PROTOCOL mode was retrieved. If the answer is YES, the access controller 55 retrieves a protocol type associated with the packet. In this regard, the access controller 55 may examine particular bits of the packet and create a protocol bit indicator from the examined bits. The protocol bit indicator may then be used in step 170 to perform a lookup on the protocol bindings table for determining whether the protocol is supported by the port. If the protocol is supported, the access controller 55 transmits the packet to the switching controller 60 which, in step 175, retrieves a VLAN ID associated with the protocol. In step 180, the switching controller classifies the packet to a VLAN based on the protocol VLAN ID.

Figure 5:
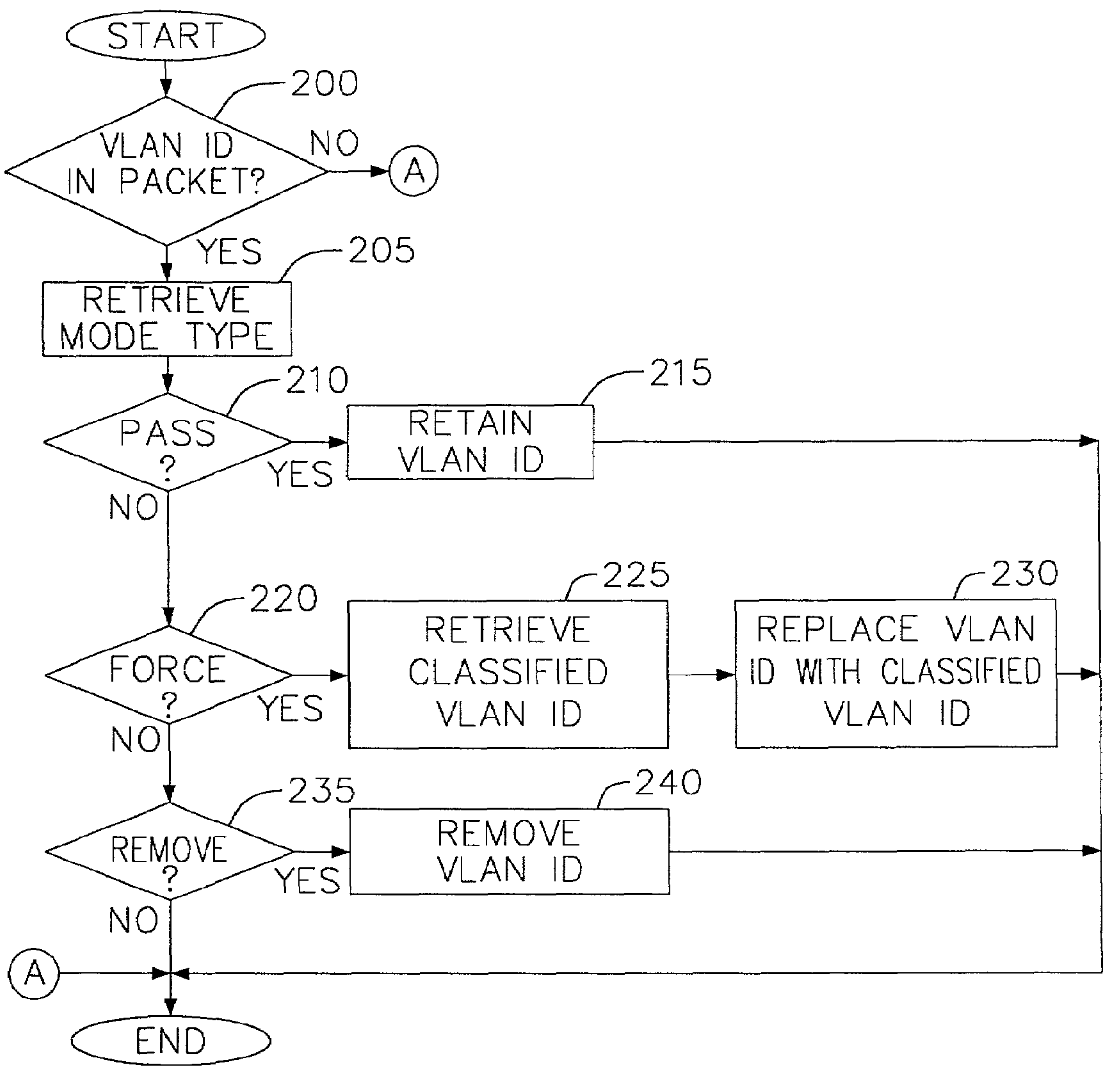
FIG. 5 is a process flow diagram for VLAN tagging a packet according to one embodiment of the invention.

FIG. 5 is a process flow diagram for VLAN tagging a packet according to one embodiment of the invention. The process starts, and in step 200, the switching controller 60 inquiries if an outbound packet includes a VLAN ID. If the answer is YES, the switching controller retrieves a tagging mode type from the mode register in step 205. In step 210, the switching controller 60 determines if a PASS mode was retrieved. If the answer is YES, the switching controller 60 retains the VLAN ID as received in the packet.

In step 220, the switching controller 60 determines if a FORCE mode was retrieved. If the answer is YES, the switching controller 60 retrieves the VLAN ID assigned to the packet during classification in step 225, and replaces the original VLAN ID in the packet with the classified VLAN ID in step 230.

In step 235, the switching controller 60 determines if a REMOVE mode was retrieved. If the answer is YES, the VLAN ID in the VLAN tag header is removed in step 240 and not replaced. The packet is then transmitted via the egress port.

Although this invention has been described in certain specific embodiments, those skilled in the art will have no difficulty devising variations which in no way depart from the scope and spirit of the present invention. For example, other classification and/or tagging modes may be made available for the ingress and/or egress ports. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A method for VLAN packet classification, comprising:
receiving an inbound packet;
detenning whether the inbound packet includes VLAN ID;
if the determination ion is made that the inbound packet includes VLAN ID;
retrieving the classification mode type from a mode register;
determining the classification mode type;
if the determination is made that the classification mode type is a first classification mode, determining if the VLAN ID is valid, and if the VLAN ID is valid, transmitting the packet to a switching controller; and classifying the packet to a VLAN associated with the VLAN ID associated with the port;
if the determination is made that the classification mode type is a second classification mode, transmitting the packet to the switching controller, retrieving a VLAN ID associated with the port, classifying the packet to a VLAN associated with the VLAN ID associated with the port; and
if the determination is made that the classification mode type is a third classification mode, retrieving a protocol type associated with the packet, and determining if the protocol type is supported, and if the determination is made that the protocol type is supported, transmitting the packet to the switching controller, classifying the packet to a VLAN based on the protocol VLAN ID.

2. The method as recited in claim 1, wherein the first classification mode is a PASS mode.

3. The method as recited in claim 1, wherein the second classification mode is a FORCE mode.

4. The method as recited in claim 1, wherein the third mode is a PORTOCOL mode.

5. The method as recited in claim 1, wherein if the determination is made that the classification mode type is a third classification mode, further comprising examining particular bits of the packet; and creating a protocol bit indicator from the examined bits.

6. The method as recited in claim 5, further comprising using the protocol bit indicator to perform a lookup on the protocol bindings table used to determine if the protocol type is supported.

7. A method for VLAN packet classification, comprising:
determining if an outbound packet includes a VLAN ID;
if the determination is made that the outbound backet includes VLAN ID;
retrieving a tagging mode type from a mode register;
determining the tagging mode type;
if the determination is made that the tagging mode type is a first tagging mode type, retaining the VLAN ID as received in the packet;
if the determination is made that the tagging mode type is a second tagging mode type, retrieving the VLAN ID from the outbound packet, replacing VLAN ID in the outbound packet with a VLAN ID to which the packet is classified; and
if the determination is made that the tagging mode type is a third tagging mode type, retrieving and removing the VLAN ID from the outbound packet.

8. The method as recited in claim 7, wherein the first tagging mode type is a PASS mode.

9. The method as recited in claim 7, wherein the second tagging mode type is a FORCE mode.

10. The method as recited in claim 8, wherein the third tagging mode type is a REMOVE mode.

11. A method for VLAN packet classification, comprising:
determining the type of data packet,
if the determination is made that the data packet is an inbound packet;
determining whether the inbound packet includes VLAN ID
if the determination is made that the inbound packet includes VLAN ID
retrieving the classification mode type from a mode register
determining the classification mode type
if the determination is made that the classification mode type is a first classification mode, determining if the VLAN ID is valid, and if the VLAN ID is valid, transmitting the packet to a switching controller, and classifying the packet to a VLAN associated with the VLAN ID associated with the port if the determination is made that the classification mode type is a second classification mode, transmitting the packet to the switching controller, retrieving a VLAN ID associated with the port, classifying the packet to a VLAN associated with the VLAN ID associated with the port; and if the determination is made that the classification mode type is a third classification mode, retrieving a protocol type associated with the packet, and determining if the protocol type is supported, and if the determination is made that the protocol type is supported, transmitting the packet to the switching controller, classifying the packet to a VLAN based on the protocol VLAN ID;

if the determination is made that the data packet is an outbound packet;

determining if the outbound packet includes a VLAN ID;

if the determination is made that the outbound packet includes VLAN ID;

retrieving a tagging mode type from a mode register;

determining the tagging mode type;

if the determination is made that the tagging mode type is a first tagging mode type, retaining the VLAN ID as received in the packet;

if the determination is made that the tagging mode type is a second tagging mode type, retrieving the VLAN ID from the outbound packet, replacing VLAN ID in the outbound packet with a VLAN ID to which the packet is classified; and if the determination is made that the tagging mode type is a third tagging mode type, retrieving and removing the VLAN ID from the outbound packet.

* * * * *